United States Patent [19]

Policastro

[11] Patent Number: 4,675,372

[45] Date of Patent: Jun. 23, 1987

[54] METHOD FOR MAKING CROSSLINKED SILICONE-POLYAMIDE BLOCK POLYMERS

[75] Inventor: Peter P. Policastro, Schenectady, N.Y.

[73] Assignee: General Electric Company, Schenectady, N.Y.

[21] Appl. No.: 854,264

[22] Filed: Apr. 21, 1986

[51] Int. Cl.[4] .............................................. C08G 77/04
[52] U.S. Cl. ..................................... 528/26; 427/387; 427/372.2; 428/422; 428/447; 528/27; 528/28
[58] Field of Search .............................. 427/387, 372.2; 428/447, 422; 528/26, 27, 28

[56] References Cited

U.S. PATENT DOCUMENTS 3,723,566  3/1973  Thompson et al. ................... 528/26
4,381,396  4/1983  Ryang ................................. 549/214

*Primary Examiner*—Melvyn I. Marquis
*Attorney, Agent, or Firm*—William A. Teoli; James C. Davis, Jr.; James Magee, Jr.

[57] ABSTRACT

A method is provided for making homogeneous fluid reaction products of aminolactam and organic anhydride substituted polydiorganosiloxane. These fluid reaction products can be used in RIM and laminating applications to make shaped, crosslinked, silicone amide block polymers.

7 Claims, No Drawings

METHOD FOR MAKING CROSSLINKED SILICONE-POLYAMIDE BLOCK POLYMERS

BACKGROUND OF THE INVENTION

Prior to the present invention as shown as Thompson et al, U.S. Pat. No. 3,723,566, ORGANOSILOXANE-POLYAMIDE BLOCK COPOLYMERS, were provided as useful as additives to nylon products or as modified nylon exhibiting bonding to glass. Improvements in silicone-polyamide block polymers are shown in the copending application Ser. No. 645,638, filed Aug. 30, 1984, for Policastro et al, SILYLPOLYAMIDES AND METHOD FOR THEIR PREPARATION, assigned to the same assignee as the present invention and now abandoned, and incorporated herein by reference. Although the silicone-polyamide block polymers of Policastro et al provide improved block polymers having improved tensile strength, further improvements in the tensile strength of silicone-polyamide block polymers are constantly being sought.

The present invention is based on my discovery that if polydiorganosiloxanes, as defined hereinafter, having chemically combined organic anhydride groups are reacted with aminosubstituted lactam, or mixtures of such aminosubstituted lactam and lactam free of such aminosubstitution, a substantially homogeneous fluid reaction product is formed which can be molded or laminated to produce high-strength, shaped, crosslinked, silicone-polyamide block polymers compositions.

STATEMENT OF THE INVENTION

There is provided by the present invention, a method of making a crosslinked silicone-polyamide, which comprises (1) forming a substantially homogeneous fluid reaction product of a mixture comprising, (A) 100 parts of lactam or cyclic amide having a group of the formula,

chemically combined with from 2 to 13 chemically combined diorgano units of the formula,

   (1)

(B) 0.001 to 10 parts of an amino substituted lactam having a group of the formula,

chemically combined with from 2 to 13 diorgano units selected from the class consisting of (i) 2 to 4 amino units of the formula

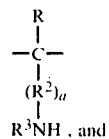   (2)

(ii) a mixture of 1 to 4 amino units of (i) and 1 to 12 diorgano units of (A), (C) 0.5 to 90 parts of a silicone anhydride consisting essentially of 1 to 1,000 chemically combined diorganosiloxy units of the formula

   (3)

and at least one chemically combined silyl organic anhydride group, and (D) an effective amount of a basic catalyst, and (2) allowing the fluid reaction product of step 1 to contact a substrate heated at a temperature of 100° to 250° C. until a crosslinked silicone-polyamide is formed, where R, R$^1$, and R$^3$ are monovalent radicals selected from hydrogen, C$_{(1-14)}$ monovalent hydrocarbon radicals, C$_{(1-14)}$ hydrocarbon radicals substituted with radicals neutral under the crosslinking reaction conditions, and mixtures thereof, R$^2$ is a C$_{(1-14)}$ divalent hydrocarbon radical, R$^4$ is a C$_{(1-14)}$ monovalent hydrocarbon radical or a C$_{(1-14)}$ monovalent hydrocarbon radical substituted with from 1 to 4 radicals which are the same or different and neutral during crosslinking of the silicone-polyamide block polymer, and a has a value of 0 or 1.

Some of the cyclic amides or lactams which can be used in the practice of the invention are, for example, caprolactam, butyrolactam, valerolactam, laurolactam, and mixtures thereof.

Some of the aminosubstituted lactams which can be used in the practice of the invention are shown by the following formulas,

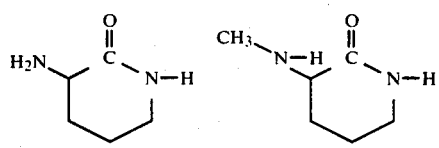

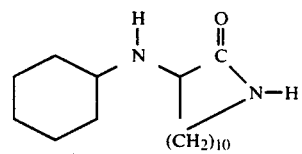

Silicone anhydride which can be utilized in the practice of the present invention having chemically combined diorganosiloxy units of Formula (3) are shown, for example, by Ryang, U.S. Pat. No. 4,381,396, assigned to the same assignee as the present invention and incorporated herein by reference. Additional silicone anhydride which can be utilized in the practice of the present invention are shown by Jonathan D. Rich, POLYANHYDRIDE SILOXANE AND POLYIMIDE SILOXANE OBTAINED THEREFROM Ser. No. 678,725, filed Dec. 5, 1984, and now abandoned, assigned to the same assignee as the present and incorporated herein by reference. Some of the silicon anhydride which can be used in the practice of the present invention are, for example,

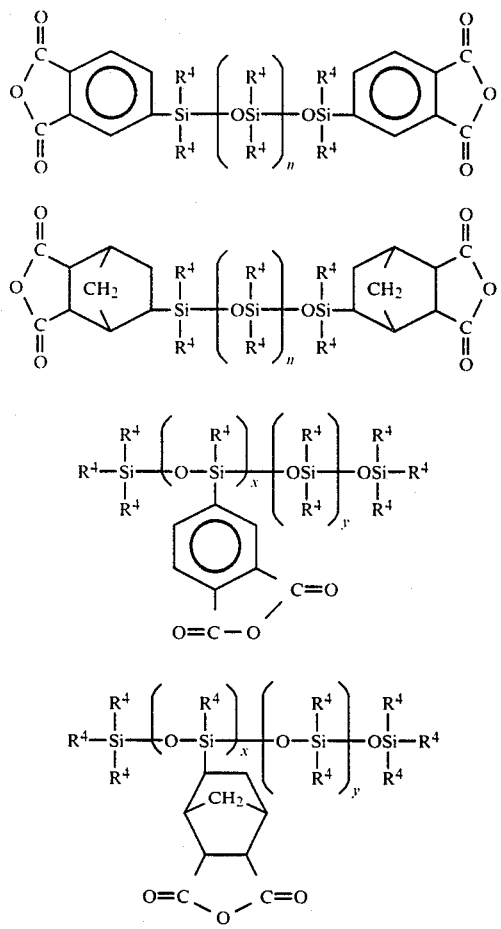

where $R^4$ is as previously defined, n is an integer having an average value of 0 to 2000, and x and y are integers, where x has a value of 1 to 200 inclusive and y has a value of 0 to 1000 inclusive.

A basic catalyst which can be utilized in the practice of the present invention are, for example, sodium hydride, potassium hydride; alkyl lithiums such as methyl lithium and phenyl lithium; Grignard reagents such as phenyl magnesium chloride or the corresponding lactimide salts such as sodium caprolactimide, potassium caprolactimide and chloromagnesium caprolactimide; metal alkoxides such as potassium and sodium t-butoxide.

An effective amount of basic catalyst is from 0.01% to 5% by weight of the catalyst, based on the weight of homogeneous fluid reaction product.

In the practice of the present invention, the order of addition of the various ingredients utilized in preparing the substantially homogeneous fluid reaction product is not critical. However, it is preferred to add the silicone anhydride to a mixture of the cyclic amide and the aminolactam in the presence of the base catalyst. Preferably, the cyclic amide and base catalyst can form a solution with the amino lactam with stirring under neat conditions prior to the addition of the silicone anhydride.

Temperatures in the range of from 100° C. to 250° C. can be employed to produce the substantially homogeneous fluid reaction product. The substantially fluid reaction product of the lactam, aminolactam and base catalyst, and the anhydride substituted organosiloxane can be molded or utilized in making a laminate utilizing substrates of glass, thermoplastic or metal at temperatures in the range of from about 100° C. to 250° C. and pressures from 5 psi to 500 psi for a period of from about 0.5 to 10 minutes.

If desired, the homogeneous fluid reaction products of the present invention also can be reinforced with from 1 to 60 parts of filler, per hundred parts of fluid reaction product. Fillers such as glass fiber, silica, ground quartz, alumina, and carbon black can be used.

In order that those skilled in the art will be better able to practice the invention, the following examples are given by way of illustration and not by way of limitation. All parts are by weight.

EXAMPLE 1

A mixture of 13.0 grams (0.11 mol) ε-caprolactam and 0.20 gram (0.008 mole) of sodium hydride, was stirred at 125° C. until gas evolution ceased. There was added to the melt, 0.10 gram (0.0008 mole) of 3-amino-ε-caprolactam followed by 7.0 gram of a polydimethylsiloxane having an average of about 39 chemically combined dimethylsiloxy units and terminal norbornane anhydride groups attached to silicon by silicon carbon linkages. The mixture became homogeneous within 15 seconds to produce a substantially homogeneous fluid reaction product. The mixture was then transferred within 30 seconds to a Teflon resin mold preheated to 160° C. After a 10 minute period at a temperature of 160° C., the mold was allowd to cool and a tough semi-transparent part was obtained. The part was cut up into small pieces and allowed to stir in m-cresol for 8 hours at 100° C. It was found to be insoluble. The same procedure wa except that 3-amino-ε-caprolactam was not utilized. The resulting product was found to readily dissolve in m-cresol.

EXAMPLE 2

There was added 0.10 gram (0.0008 mole) of 3-amino-ε-caprolactam to a solution of 1.1 gram (0.005 mol) of laurolatam and 12.3 grams (0.11 mol) of ε-caprolactam and 0.2 gram (0.008 mol) of sodium hydride which was added to the mixture at 125° C. resulting in the evolution of hydrogen gas. There was then added to the mixture 7 grams of norbornane anhydride terminated polydimethylsiloxane of Example 1. The mixture became homogeneous within 15 seconds and it was transferred to a Teflon resin mold preheated to 160° C. After 10 minutes of heating in the mold, the mold was allowed to cool and a tough transparent crosslinked silicon polyamide was obtained. The part was analyzed on an Instron Mechanical Analyzer. It was found to have a tensile strength at break of 4100 psi and a 230% elongation. The same procedure was repeated except that the 3-amino-ε-caprolactam was not utilized in preparing the silicone polyamide part. The resulting silicone polyamide exhibited a tensile strength at break of 3600 psi and 145% elongation. These results show that the homogeneous fluid reaction product of the present invention provide shapes of crosslinked silicon-polyamide exhibiting improved tensile strength and elongation % as compared to prior art procedures.

Although the above examples are directed to only a few of the very many variables which can be utilized in the practice of the method of the present invention, it should be understood that the method of the present invention is directed to the use of a much broader variety of cyclic amide, aminolactam, base catalyst, and anhydride substituted organosiloxane as shown in the description proceeding these examples.

What is claimed is:

1. A method of making a crosslinked silicone-polyamide which comprises
(1) forming a substantially homogeneous fluid reation mixture comprising,
(A) 100 parts of a cyclic amide having a $$\begin{matrix} \text{O} & \text{H} \\ \| & | \\ -\text{C}-\text{N}- \end{matrix}$$

group chemically combined with from 2 to 13 chemically combined diorgano units of the formula,

(B) 0.001 to 10 parts of an amino substituted lactam having a $$\begin{matrix} \text{O} & \text{H} \\ \| & | \\ -\text{C}-\text{N}- \end{matrix}$$

group chemically combined with from 2 to 13 diorgano units selected from the class consisting of 2 to 4 amino units of the formula

a mixture of 1 to 4 of such amine units, and 1 to 12 diorgano units of the formula,

(C) 0.5 to 90 parts of a silicone anhydride consisting essentially of 1 to 1,000 chemically combined diorganosiloxy units of the formula

and at least one chemically combined silyl organic anhydride group selected from the class consisting of norbornane anhydride and phthalic anhydride, and (D) from 0.01% to 5% by weight of a basic catalyst, based on the weight of homogeneous fluid reaction product, and (2) allowing the fluid reaction mixture of step 1 to contact a substrate heated at a temperature of 100 to 250° C. until a crosslinked silicone-polyamide is formed, where R, R$^1$, and R$^3$ are monovalent radicals selected from hydrogen, C$_{(1-14)}$ monovalent hydrocarbon radicals, C$_{(1-14)}$ hydrocarbon radicals substituted with radicals neutral under the crosslinking reaction conditions, and mixtures thereof, R$^2$ is a C$_{(1-14)}$ divalent hydrocarbon radical, R$^4$ is a C$_{(1-14)}$ monovalent hydrocarbon radical or a C$_{(1-14)}$ monovalent hydrocarbon radical substituted with from 1 to 4 radicals which are the same or different and neutral during crosslinking of the silicone polyamide block polymer, and a has a value of 0 or 1.

2. A method in accordance with claim 1, where the cyclic amide is ε-caprolactam.

3. A method in accordance with claim 1, where the cyclic amide is a mixture of laurolactam and εcaprolactam.

4. A method in accordance with claim 1, where the aminosubstituted lactam is 3-amino-ε-caprolactam.

5. A method in accordance with claim 1, where the base catalyst is sodium or potassium hydride.

6. A method in accordance with claim 1, where the silicone anhydride is a norbornane substituted polydimethylsiloxane.

7. A shaped cross-linked silicone-polyamide made in accordance with the method of claim 1.

* * * * *